United States Patent [19]
Lohbauer

[11] 3,710,824
[45] Jan. 16, 1973

[54] HIGH PRESSURE RELIEF VALVE

[75] Inventor: Kenneth R. Lohbauer, Joliet, Ill.

[73] Assignee: Caterpillar Tractor Co., Peoria, Ill.

[22] Filed: May 7, 1971

[21] Appl. No.: 141,229

[52] U.S. Cl. ........................... 137/596, 137/612.1
[51] Int. Cl. .................... F16k 17/26, F16k 31/12
[58] Field of Search.137/596, 596.13, 596.12, 596.2, 137/612.1, 612.2; 91/446, 451, 468

[56] References Cited

UNITED STATES PATENTS

| | | | |
|---|---|---|---|
| 2,954,052 | 9/1960 | Krehbiel | 137/612.2 |
| 3,460,567 | 8/1969 | Martin | 137/596 |
| 3,506,031 | 4/1970 | Stacey | 137/596 |
| 3,362,430 | 1/1968 | Olen | 137/596 |

Primary Examiner—Henry T. Klinksiek
Assistant Examiner—Robert J. Miller
Attorney—Fryer, Tjensvold, Feix, Phillips & Lempio

[57] ABSTRACT

There is disclosed a control valve arrangement for controlling a double-acting hydraulic motor. A makeup valve and a relief valve are provided for precisely controlling the high pressure and the low pressure in a motor control passage of the system.

5 Claims, 3 Drawing Figures

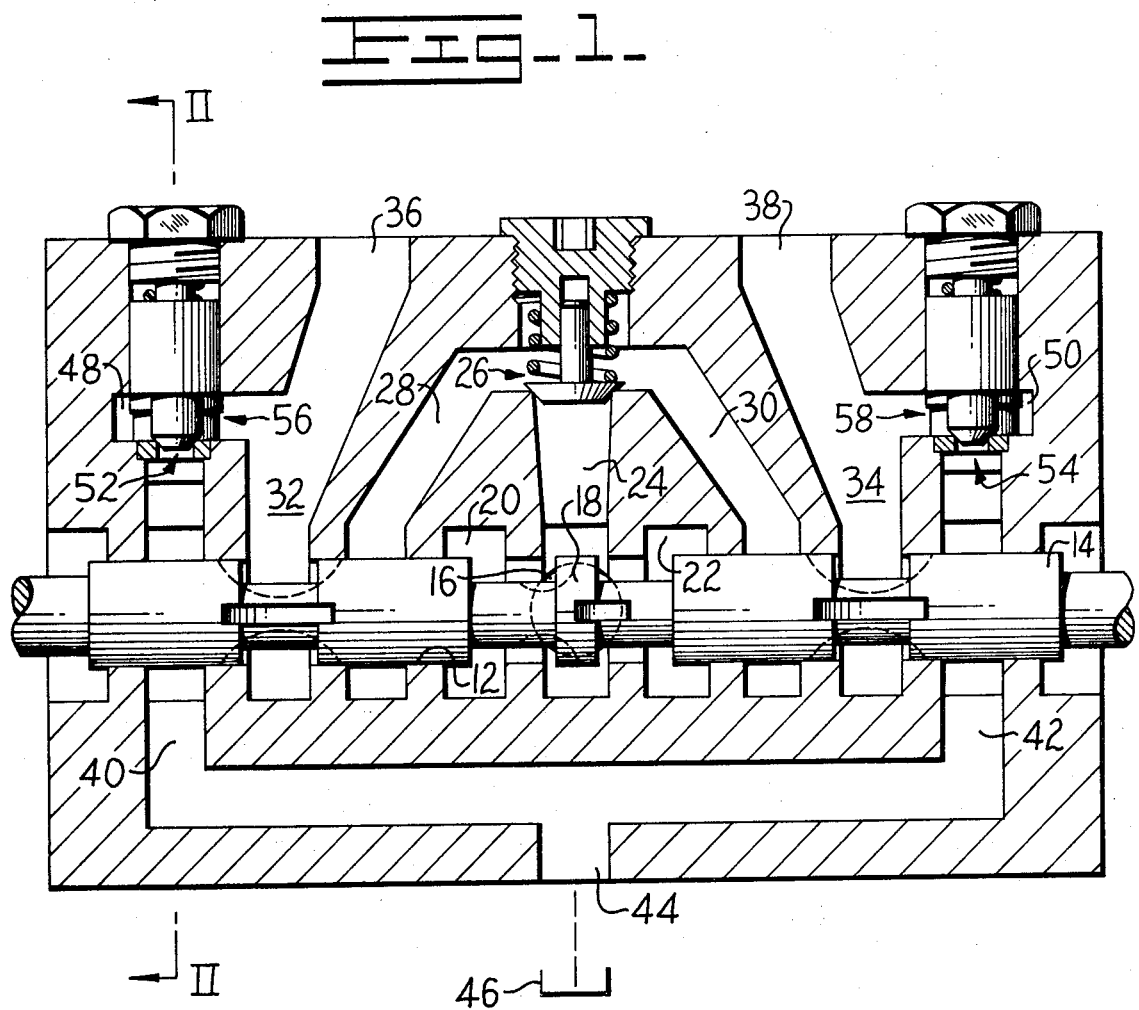

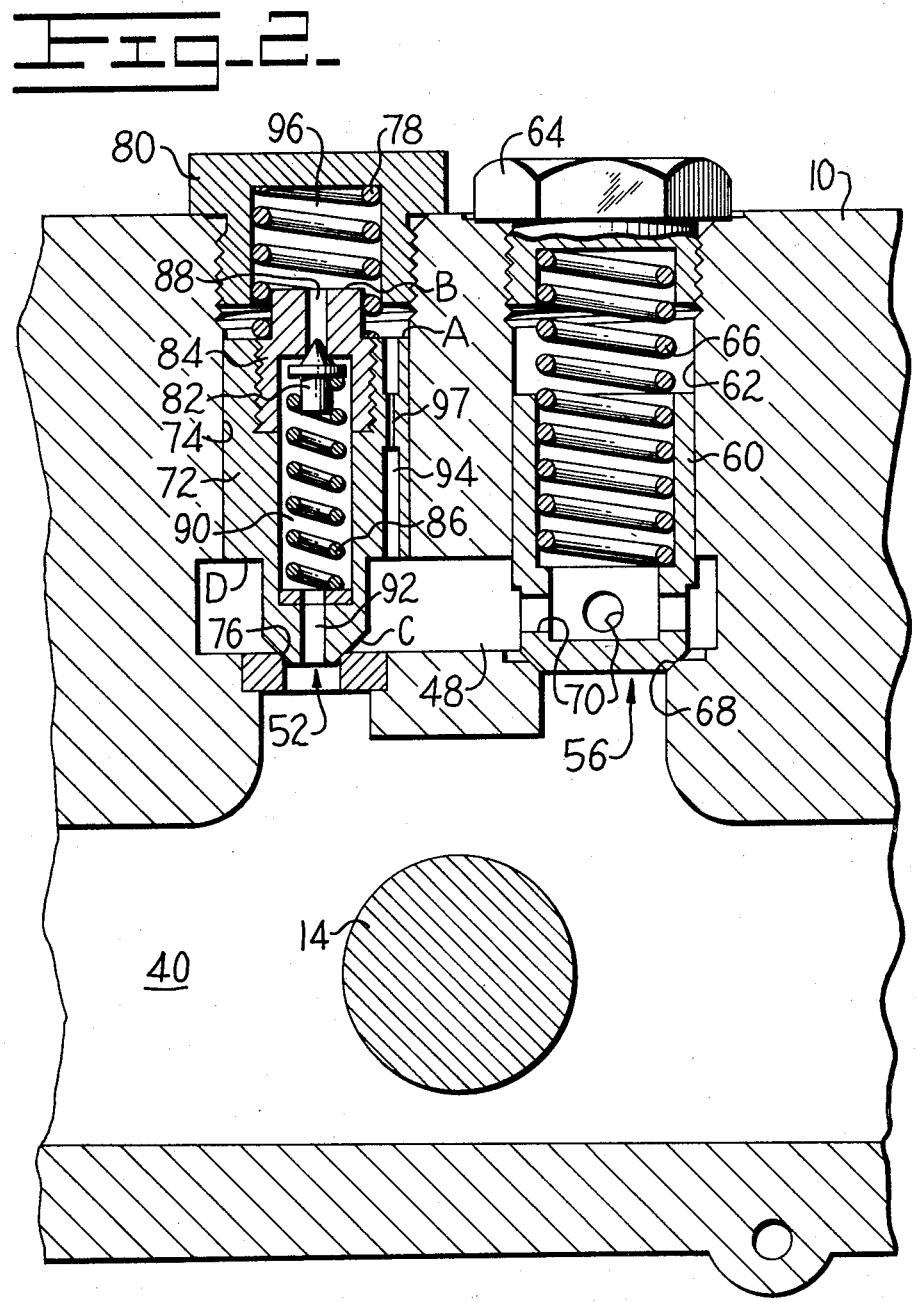

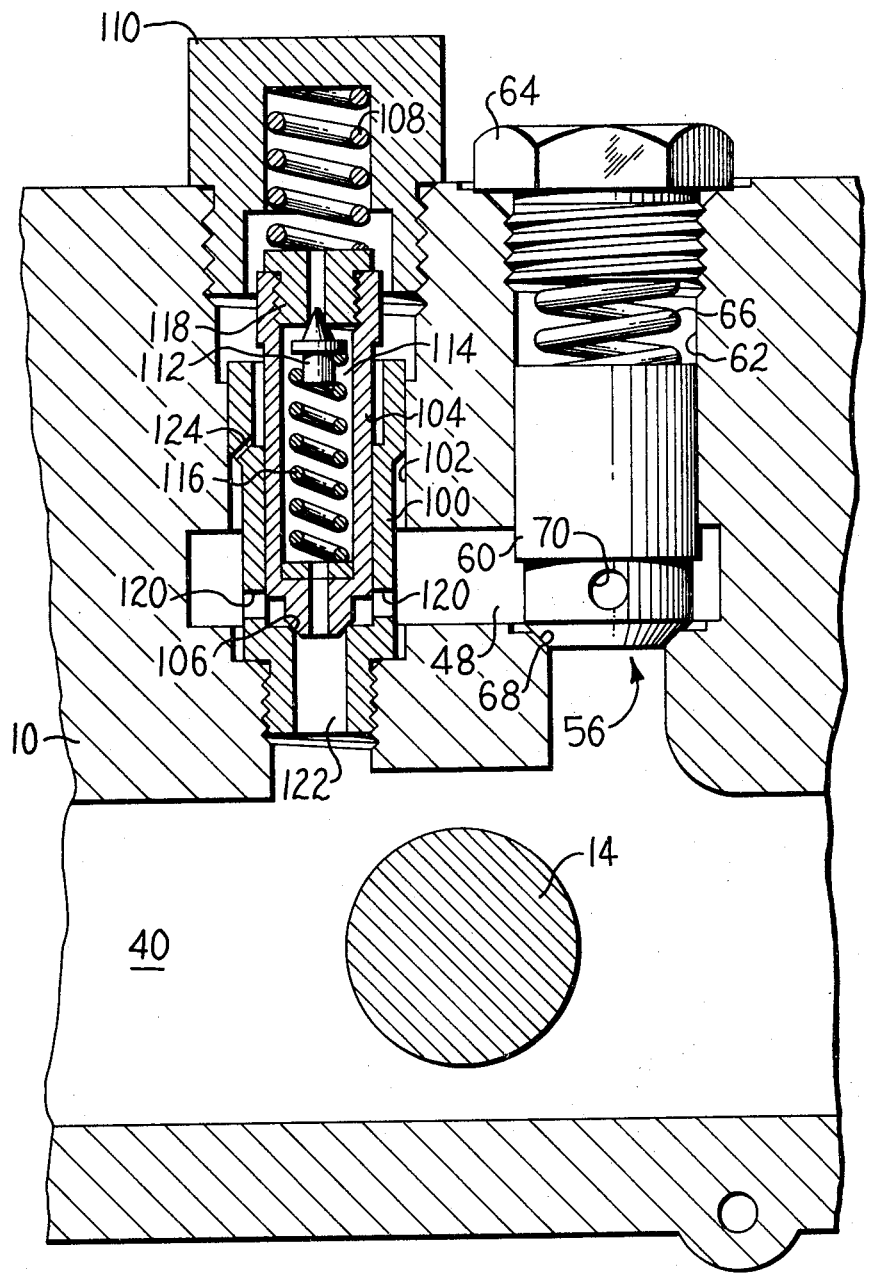

HIGH PRESSURE RELIEF VALVE

BACKGROUND OF THE INVENTION

The present invention relates to hydraulic systems and pertains more particularly to a high-pressure hydraulic system for controlling double-acting motors for use in hydraulic excavators and the like.

Hydraulic machines such as excavators and loaders employ high pressure hydraulic systems including double-acting motors to manipulate material handling buckets on swinging arms or booms. The loads handled by such devices vary considerably and are subject to rapid acceleration and deceleration. Such conditions can cause the fluid pressure to rise to pressures in excess of the limits of the systems as well as drop to less than atmospheric pressure in the motor control lines.

These high pressures can cause rupture of the lines and/or cylinders and other damage to the system. A vacuum, on the other hand, creates cavitation within the cylinders and causes pitting and erosion of the pistons and cylinder walls.

Such high pressures may exist in one side of a motor circuit at the same time that a vacuum is created in the other side of the motor circuit. This condition can be created when the boom is abruptly halted from a rapid swing or from a rapid drop when loaded. Such conditions cause rapid deterioration and early failure of such hydraulic systems.

Relief valves and anti-cavitation valves have been put into such systems to overcome the above described problems. The prior art is embraced by such U.S. Pats. as Nos. 2,954,011 and 2,954,052, issued Sept. 27, 1960, to R. D. Krehbiel.

A major problem with prior art systems is that they employ complex arrangements of ports and passageways. Moreover, the valve constructions are such that the valves regulating makeup and relief are subject to being influenced by the flow of fluid through them. Thus, precise control of the fluid within the system is not possible. Furthermore, such complex arrangements are expensive to manufacture and maintain.

SUMMARY OF THE INVENTION

Therefore, it is the primary object of the present invention to overcome the above problems with the prior art systems.

Another object of the present invention is to provide a hydraulic control system employing makeup and relief valves that are simple and easy to manufacture.

A further object of the present invention is to provide a control valve arrangement for a hydraulic system employing makeup and relief valves that are capable of precisely controlling the pressures within the system.

A still further object of the present invention is to provide improved porting and valve arrangement for a combination of makeup and relief valves in conjunction with a control spool of a main control valve.

In accordance with the present invention, a control valve assembly for a high pressure hydraulic system employs a combination of makeup and relief valves in a single by-pass passageway extending between a low pressure return line and a high pressure motor passage.

BRIEF DESCRIPTION OF THE DRAWINGS

The above and other advantages of the present invention will become apparent from the following description when read in conjunction with the accompanying drawings wherein:

FIG. 1 is an elevational view in section of a control valve embodying the present invention;

FIG. 2 is a sectional view taken substantially along line II—II of FIG. 1;

FIG. 3 is a sectional view similar to FIG. 2 of an alternate embodiment.

DETAILED DESCRIPTION OF PREFERRED EMBODIMENTS

Referring now to the drawings and in particular to FIG. 1, there is illustrated a control valve assembly, comprising a housing 10 having a throughbore 12 in which is disposed a slidable control spool 14. The spool 14 is shown in its neutral position and is moveable to alternate positions to provide communication between the various passageways in the valve body. More particularly, an inlet passage 16 intersects the spool 14 at the center thereof and communicates along the bore 12 to either side of land 18 to the branches 20 and 22 of a through passage (not shown) which takes the fluid back to sump when the valve is in neutral position. The inlet 16 also communicates by a supply passage 24 by way of a check valve 26 to branch supply passages 28 and 30 which intersect the spool 14 at either side of the through passage and adjacent motor control passages 32 and 34. The motor control passages 32 and 34 supply fluid to high pressure motor ports 36 and 38 which are then connected by suitable conduits to a double-acting fluid motor (not shown). A low pressure passageway, having branches 40 and 42 intersecting the control spool 14 at positions adjacent motor control passages 32 and 34, communicates with an outlet passage 44 which is connected by suitable conduits to sump 46. A pair of short substantially T-shaped, bypass passages 48 and 50 extend between motor passages 32 and 34 and low pressure branches 40 and 42 at a point just above the control spool 14. Communication between these high and low pressure passageways by way of the bypass passages are controlled by a pair of pressure relief valves 52 and 54 and a pair of makeup valves or anti-cavitation check valves 56 and 58 disposed directly behind the relief valves when viewed in FIG. 1. These are better seen in side-by-side relationship as viewed in FIG. 2 and disposed directly above the control spool 14.

Referring now to FIG. 2, there is illustrated in detail the construction of the makeup and relief valves. The anti-cavitation valve 56 is a vacuum check valve and comprises a cylindrical valve member 60 disposed in a bore 62, a threaded plug 64 and a spring 66 in slight compression disposed between the valve member 60 and plug 64. The valve member 60 engages a seat 68 for sealing communications between the high pressure passage 48 and the low pressure passage 40. The valve member 60 includes a plurality of openings 70 to permit communication of high pressure fluid from the high pressure passage 48 into the interior of the valve member 60 behind the face thereof.

The construction of this anti-cavitation check valve is such that the spring 66 provides light force to bias the valve member 60 into engagement with the seat 68 such that the spring force is merely sufficient to overcome normal friction and inertia of the valve. The main force holding the valve seated comes from the high pressure fluid in passageway 48 communicating through opening 70. With this construction, a vacuum created in a high pressure motor port in communication with the passageway 48 would result in a drop in pressure inside the valve member 60 with a result that low pressure fluid in passageway 40 will open check valve 56 and flow by way of passageway 48 into the motor passage. Thus, a very sensitive vacuum check anti-cavitation valve is provided.

The high pressure relief valve comprises a valve body 72 disposed in a cylindrical bore 74 and biased into engagement with a seat 76 by means of a spring 78 retained between the valve member 72 and a threaded cap or plug 80. The high pressure relief valve includes a pilot poppet valve comprising a poppet plunger 82 biased into engagement with a seat formed in a plug member 84 threadably attached to the valve member 72. The plunger 82 is biased into seating engagement by means of a spring 86 for closing a passageway 88 against communication with a chamber 90 and low pressure passageway 40 by means of a passageway 92. A passageway 94 having a restriction 97 is formed in the valve body 72 to provide communication between high pressure port 48 and the poppet valve or plunger 82.

The operation of the high pressure relief valve is such that the pressure at which the relief valve assembly 52 will open and relieve chamber 48 is determined by the pilot poppet spring 86. When the pilot poppet plunger 82 opens, the main poppet piston 72 will also open.

The pressure in chamber 48 reflects the pressure which is present in the motor control lines leading from the control valve to the fluid motors. The pressure in chamber or passageway 48 is communicated through passage 94 to the main poppet spring chamber 96 where it also communicates by way of passageway 88 and acts against the poppet plunger 82. The pilot poppet plunger 82 is held closed against passage 88 by the pilot spring 86 which is compressed between the pilot plunger 82 and the internal bore of the main poppet piston 72. The high fluid pressure in chamber 96 acting on areas A and B plus the force of compressed spring 78 hold the main poppet 72 seated against the seat 76 and thereby maintains a closed condition between passages 48 and 40. The high pressure in chamber of passageway 48 also acts on areas C and D of the main poppet 72 tending to force the poppet off of the seat member 76. However, since the areas A and B are larger than areas C and D and since the pressure in chambers 48 and 96 are normally equal or near equal, the main poppet valve 72 remains seated against the member 76. The force of spring 78 also adds to the force of holding poppet 72 against the seat 76.

When the pressure in chamber 96 is relieved in some manner, the force of spring 78 acting against the main poppet 72 would not be great enough to hold the poppet against the seat 76 under the force of the pressure in chamber 48 acting on areas C and D so that the main poppet 72 would be unseated. This would occur if pilot poppet plunger 82 becomes unseated and allows the pressure in chamber 96 to flow into passage 40 by means of passageway 92. However, in order to unseat the pilot poppet plunger 82, the pressure in chamber 96 must be high enough to overcome the force of compressed pilot spring 86. The force needed to overcome the spring 86 is, therefore, the product of the pressure in chamber 96 acting upon the area of the pilot plunger 82. The force needed to overcome the spring 86, therefore, can easily be calculated in a spring directly calibrated to correspond to the desired maximum relief pressure in chamber 48.

When the pressure in the chamber 48 rises to the maximum desired pressure, chamber 96 also reflects this same pressure since the two chambers are connected by the passageway 94. This pressure acting on the face area of the pilot poppet plunger 82 will compress the spring 86 and allow the pilot poppet plunger to become unseated. This will vent chamber 96 to the tank line 40 as previously described and the high pressure in chamber 48 acting on area C and D of the main poppet 72 will unseat the poppet piston and vent the high pressure chamber 48 to the low pressure exhaust or return line 40. A restriction 97 in the passage 94 allows a pressure differential to exist between the chambers 48 and 96 so that the pressure flowing from chamber 48 into chamber 96 will not tend to prematurely reclose the main poppet piston 72 before the high pressure in chamber 48 has been relieved.

The subject high pressure relief valve assembly serves to protect the individual hydraulic lines from damage due to extreme pressures caused by external forces. These relief valves function at any time the pressure in the individual hydraulic motor lines exceeds the relief valve setting. The anti-cavitation valves likewise function at any time the pressure in the return lines is greater than the pressure in the motor lines.

Referring now to FIG. 3, there is illustrated an alternate construction for the relief valve. This alternate construction may be referred to more particularly as a cartridge-type valve. This embodiment comprises a sleeve member 100 threadably connected into a bore 102 formed in housing 10 and intersecting passageways 48 and 40. A valve member 104 is mounted within the sleeve 100 and biased into engagement with a seat 106 by means of a main valve spring 108 held under compression by means of a cap member 110 threadably engaging the bore 102. The valve includes a poppet plunger 112 disposed in a chamber 114 in the valve member 104 and biased by means of a poppet spring 116 into seating engagement with a seat formed in plug 118 threadably connected into the end of the valve member 104.

A plurality of openings 120 are formed in sleeve 100 to provide communications with passageway 48 and a passageway 122 communicating directly with the low pressure passage 40. The position of the openings 120 are such that, as in the previously described embodiment, the flow of fluid from the passageway 48 to the passageway 40 will be radially across the face of the valve 104 to the valve's seat opening. With this construction and arrangement the valve 104 is more directly responsive to pressure from chamber 48 and is not affected by flow of fluid along the length of the valve body as in prior art constructions. A pressure passageway 124 is provided for communication of the high pressure fluid in passage 48 to the pilot poppet valve.

While this invention has been described with respect to specific embodiments, it is to be understood that changes and modifications may be made in the above described system without departing from the spirit and scope of the present invention as defined in the appended claims.

What is claimed is:

1. In combination with a hydraulic control valve, said valve comprising a housing, a bore formed in said housing, a slidable spool reciprocally disposed in said bore, an inlet and an exhaust outlet; a feeder passage in communication with said inlet and intersecting said spool, a pair of high pressure motor control passages intersecting said spool to either side of said feeder passage and an exhaust passage intersecting said spool adjacent said motor passages the improvement comprising:
- a bypass passage formed in said housing between said high pressure motor control passage and said exhaust passage;
- a pair of check valves controlling fluid flow in said bypass passage;
- one of said check valves comprising a high pressure relief valve to relieve excess pressure from said high pressure motor port;
- the other of said check valves controlling the flow of low pressure fluid from said exhaust passage to said high pressure motor passage to prevent cavitation therein, said bypass passageway comprises a T-branch and said check valves are disposed in side-by-side relation in said branch.

2. The invention of claim 1 wherein said relief valve is positioned so that the high pressure fluid flows transverse to the axis of said valve to the valve seat.

3. The invention of claim 1 wherein said relief valve includes a pilot valve and a restricted passageway communicates said pilot valve with said high pressure passage.

4. The invention of claim 1 wherein said anti-cavitation valve is a vacuum check valve.

5. The invention of claim 1 wherein said check valves extend perpendicular to the high pressure bypass, and control communication directly to the exhaust passage at the intersection of said exhaust passage with said control spool.

* * * * *